United States Patent
Karpovsky et al.

(10) Patent No.: US 11,165,791 B2
(45) Date of Patent: Nov. 2, 2021

(54) CLOUD SECURITY USING MULTIDIMENSIONAL HIERARCHICAL MODEL

(71) Applicant: Microsoft Technology Licensing, LLC, Redmond, WA (US)

(72) Inventors: Andrey Karpovsky, Redmond, WA (US); Ron Matchoro, Redmond, WA (US); Haim Saadia Ben Danan, Redmond, WA (US); Yotam Livny, Redmond, WA (US); Naama Kraus, Redmond, WA (US); Roy Levin, Redmond, WA (US); Tamer Salman, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 322 days.

(21) Appl. No.: 16/351,962

(22) Filed: Mar. 13, 2019

(65) Prior Publication Data
US 2020/0296117 A1 Sep. 17, 2020

(51) Int. Cl.
*H04L 29/06* (2006.01)
*H04L 12/911* (2013.01)
*H04L 29/08* (2006.01)

(52) U.S. Cl.
CPC .......... *H04L 63/1416* (2013.01); *H04L 47/70* (2013.01); *H04L 67/10* (2013.01); *H04L 67/42* (2013.01)

(58) Field of Classification Search
None
See application file for complete search history.

(56) References Cited

U.S. PATENT DOCUMENTS

| 6,704,874 | B1* | 3/2004 | Porras | H04L 41/142 709/224 |
| 9,479,518 | B1* | 10/2016 | Fang | G06F 16/24575 |
| 9,591,018 | B1 | 3/2017 | Zakian et al. | |

(Continued)

OTHER PUBLICATIONS

E-Security "Partner Sales Guide" winter 2002. Downloaded from Internet May 12, 2006 (Year: 2006).*

(Continued)

*Primary Examiner* — Scott B Christensen
(74) *Attorney, Agent, or Firm* — Schwegman Lundberg & Woessner, P.A.

(57) ABSTRACT

Generally discussed herein are devices, systems, and methods for computer or other network device security. A method can include identifying a profile associated with event data regarding an operation performed on a cloud resource, determining whether the event data is associated with anomalous customer interaction with the cloud resource, in response to determining the event data is associated with anomalous customer interaction, identifying whether another cloud resource of the cloud resources with a lower granularity profile that is associated with the profile of the cloud resource has previously been determined to be a target of an anomalous operation, and providing a single alert to a client device indicating the anomalous behavior on the cloud resource in response to determining both the event data is associated with anomalous customer interaction and the another cloud resource is determined to be the target of the anomalous operation.

20 Claims, 8 Drawing Sheets

(56) References Cited

U.S. PATENT DOCUMENTS

| | | | |
|---|---|---|---|
| 9,654,485 B1 | 5/2017 | Neumann | |
| 2002/0032871 A1* | 3/2002 | Malan | H04L 41/22 |
| | | | 726/23 |
| 2007/0107052 A1* | 5/2007 | Cangini | G06F 21/55 |
| | | | 726/22 |
| 2019/0123904 A1* | 4/2019 | Ackerman | G06F 21/45 |

OTHER PUBLICATIONS

"International Search Report and Written Opinion Issued in PCT Application No. PCT/US2020/015750", dated May 18, 2020, 11 Pages.

* cited by examiner

CLOUD SECURITY USING MULTIDIMENSIONAL HIERARCHICAL MODEL

BACKGROUND

In the field of security, there is an arms race between perpetrators and security professionals. While perpetrators develop increasingly advanced attack methods and tools, security professionals devise new ways for detecting them. This leads to continuously escalating number of detection signals provided to security officers and demanding their attention.

SUMMARY

This summary section is provided to introduce aspects of embodiments in a simplified form, with further explanation of the aspects of embodiments following in the detailed description. This summary section is not intended to identify essential or required features of the claimed subject matter, and the combination and order of elements listed in this summary section are not intended to provide limitation to the elements of the claimed subject matter.

Generally discussed herein are devices, systems, machine-readable mediums, and methods for computer security of cloud resources. A system, machine-readable medium or method can include or use memory device including profiles thereon, each profile of the profiles detailing non-anomalous behavior of a client interaction with a cloud resource of the cloud resources, wherein each profile is associated with a granularity level and each profile at a higher granularity level than a lowest granularity level is associated with a lower granularity profile, the lower granularity profile associated with a different cloud resource of the cloud resources that must be accessed to perform the operation on the cloud resource. The system, machine-readable medium, or method can include or use processing circuitry or other circuitry to perform operations for cloud resource security.

The operations can include identifying the profile of the profiles associated with event data, the event data regarding an operation performed on the cloud resource and including data identifying the cloud resource of the cloud resources that is a destination of the operation and the client that is a source of the operation, determining whether the event data is associated with anomalous customer interaction with the cloud resource, in response to determining the event data is associated with anomalous customer interaction, identifying whether another cloud resource of the cloud resources with a lower granularity profile that is associated with the profile of the cloud resource has previously been determined to be a target of an anomalous operation, and providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

The operations can further include before identifying the profile associated with the event data, determining whether an event type of the event data indicates the event data indicates anomalous behavior. The operations can further include determining whether another cloud resource of the cloud resources with a lower granularity profile that is associated with the profile of the cloud resource has previously been determined to be a target of an anomalous operation in response to determining the event type indicates anomalous behavior (e.g., a failed login).

The operations can further include, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity. The operations can further include, wherein the operations further comprise comparing the score to a minimum threshold and refraining from presenting the score on the view in response to determining the score is less than the minimum threshold.

The operations can further include, wherein, identifying whether another cloud resource of the cloud resources with a lower granularity profile that is associated with the profile of the cloud resource has previously been determined to be a target of an anomalous operation includes using a machine learning technique configured to classify anomalous operations into a single malicious attack type. The operations can further include, wherein the operations further include identifying an entity associated with the event data and comparing an operation associated with the event data to an entity profile for the identified entity and any entity profiles with a lower granularity than the entity profile that is associated with the entity.

The operations can further include determining whether the event data is associated with anomalous customer interaction with the cloud resource includes determining that a likelihood of the customer performing an operation associated with the event is less than a threshold probability based on the profile. The operations can further include, wherein identifying whether another cloud resource of the cloud resources with a lower granularity profile that is associated with the profile of the cloud resource has previously been determined to be a target of an anomalous operation includes determining that a likelihood of the customer performing an operation associated with the event is less than a threshold probability based on the lower granularity profile.

DETAILED DESCRIPTION

Figure 1:
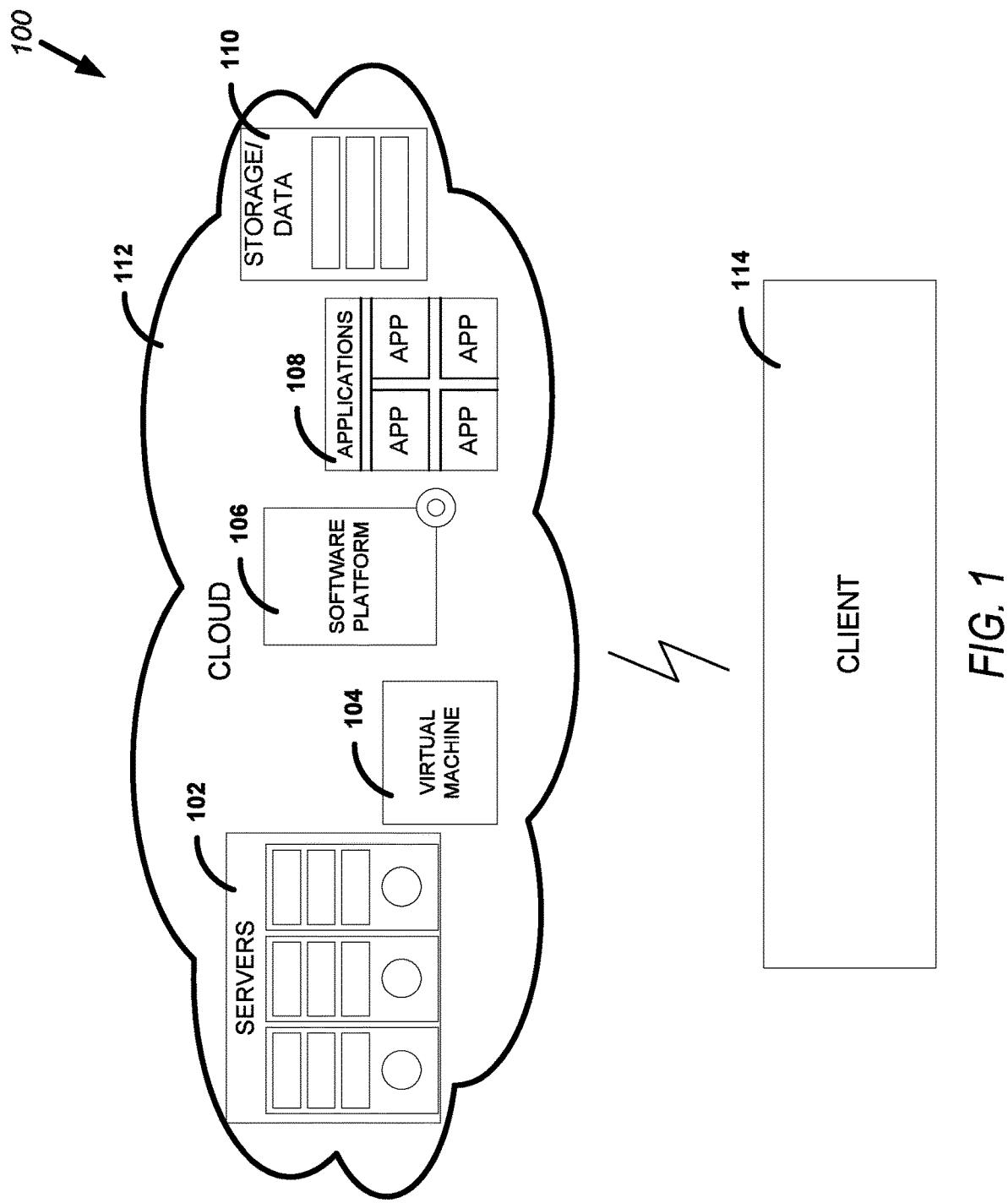
FIG. 1 illustrates, by way of example, a diagram of an embodiment of a cloud service system.

In the following description, reference is made to the accompanying drawings that form a part hereof. The drawings show, by way of illustration, specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable media) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor (DSP), application specific integrated circuit (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry. Processing circuitry can include electric and/or electronic components. Electric and/or electronic components can include one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs. or the like.

In the field of computer and network security, as previously discussed in the Background, there is an arms race between perpetrators and security professionals. In the arms race, perpetrators develop increasingly advanced attack methods and tools and security professionals devise new ways for detecting the attacks. The new techniques of detecting the attacks are usually added along with old techniques, thus escalating a number of detection methods and corresponding detection data provided to security officers. This increasing amount of data is difficult to manage and act upon, such as in a triage of the attacks.

Consider that a first attack can be at a client, another attack can be at an infrastructure device, and yet another attack be at a database. All of the attacks can be consequential, but it is very difficult for a security officer to determine which of the attacks to abate, fix, or prevent, if the security officer is forced to choose. Further consider that an attack can be distributed and can include attacks from multiple devices. These attacks can be different steps of the killchain of the same (possibly distributed) attack. One attack (or portion of an attack) can force the data of the database to be unavailable, thus making the services that access the database unavailable. Another attack can be at a client, thus reducing an employee's output and stymying business progress. Another attack can be at a firewall, thus allowing unauthorized users to access devices of the network and carry out further attacks or bog down network resources with unauthorized access.

A currently accepted way to present the attack detection data is a unified dashboard. This allows the security officer easy access to all the information. However, a large number of different security alerts might result in alert fatigue, reduce security officer's attention, and reduce security officer's confidence in the quality of alerts. The increased data can, and has, led to vital alerts going unnoticed and further network damage being done. Thus, this lack of sufficient filtering of the security data leads to wasted time, resources, and money in attending to and repairing damage from attacks that might have otherwise been preventable. Embodiments herein can help filter the security data so that the most relevant and most important security data is readily identifiable and accessible in the dashboard. The dashboard is a graphical user interface (GUI) and embodiments improve upon the operation of prior dashboards by more succinctly summarizing the security data, while highlighting the most relevant security data that should be acted upon.

A common solution for filtering security data is ranking of alerts by a determined severity or magnitude. This is not efficient, in particular when a large number of alerts of different magnitude and in different (but related) contexts are present. The ranking is not efficient (both in precision and recall), such as when a large number of events of different magnitude and in different, but related, contexts are present. This problem is exacerbated exponentially when more models and alert types are added, thus the solution is not scalable.

Embodiments provide a general platform for generating security alerts in a common multivariate and multilevel context, allowing representation of alerts in a multidimensional array format. The representation can be used for unified and concise presentation of alerts as part of a security dashboard.

Embodiments can include learning and generating compound alerts, such as by applying one or more machine learning methods over this representation for detecting "rare but stable" signal patterns across multiple cloud resources. The multiple "rare but stable" patterns can indicate complex "attack kill chain" patterns.

Some prior solutions use existing domain knowledge to compare multiple signals to models or profiles of known multivariate attack scenarios, and use these matches as high-fidelity alerts. The problem with this approach is that it requires previous knowledge about specific attacks, and thus is vulnerable to mutating or new types of attacks.

Embodiments provide aspects that can improve the efficiency of understanding and acting upon available alerts by security officer working in a unified security center/hub environment. Usually, alerts are coming from different sources, with different scope and severity metrics (which could be used to rank these alerts). However, this format quickly becomes inefficient—for example, in case of 5 types of alerts at 3 profile levels, there are $(3*4/2)*4=24$ possible different alerts. In case of 7 types of alerts at 6 profile levels this number increases to $(6*7/2)*7=147$, which is unmanageable.

Embodiments can improve the representation of alerts in a unified and concise matrix format, derived from a multidimensional array used to generate the alerts. The representation improves the utility and operation of the GUI supporting the security officer decision.

Embodiments can further improve upon a framework for generating compound alerts. Embodiments can apply machine learning methods to aggregate multiple alerts into a single alert, which further decreases the number of different alerts by combining them to unified 'kill chain' scenarios and adding more complex types of detection.

FIG. 1 illustrates, by way of example, a diagram of an embodiment of a cloud service system 100. The system 10) as illustrated includes a cloud infrastructure 112 and a client 114. The cloud infrastructure 112 includes computer devices which the client 114 can access for their own computing needs. The computer devices as illustrated include servers 102, virtual machines 104, software platform 106, applications 108, and storage/data 110.

The cloud infrastructure 112 is a global network of servers and other computer resources that are accessible through the Internet and provides a variety of hardware and software services. These resources are designed to either store and manage data, run applications, or deliver content or provide another service. Services can include streaming videos, web mail, office productivity software, or social media, among others. Instead of accessing files and data from a local or personal computer, cloud data is accessed online from an Internet-capable device, such as the client 114.

The servers 102 can provide results as a result of a request for computation. The server 102 can be a file server that provides a file in response to a request for a file, a web server that provides a web page in response to a request for website access, an electronic mail server (email server) that provides contents of an email in response to a request, a login server that provides an indication of whether a username, password, or other authentication data are proper in response to a verification request.

The virtual machine (VM) 104 is an emulation of a computer system. The VM 104 provides the functionality of a physical computer. VMs can include system VMs that provide the functionality to execute an entire operating system (OS) or process VMs that execute a computer application in a platform-independent environment. VMs can be more secure than a physical computer as an attack on the VM is merely an attack on an emulation. VMs can provide functionality of first platform (e.g., Linux, Windows, or another OS) on a second, different platform. More detail regarding a VM is provided in FIG. 2.

The software platform 106 is an environment in which a piece of software is executed. The software platform 106 can include hardware, OS, a web browser and associated application programming interfaces (APIs), or the like. The software platform 106 can provide tools for developing more computer resources, such as software. The software platform 106 can provide low-level functionality for a software developer to perform their job.

The applications 108 can be accessible through one of the servers 102, the VM 104, a container (see FIG. 3), or the like. The applications 108 provide compute resources to a user such that the user does not have to download or execute the application on their own computer. The applications 108, for example, can include a machine learning (ML) suite that provides configured or configurable ML software. The ML software can include artificial intelligence type software, such as can include a neural network (NN) or other technique. The ML or AI techniques can have memory or processor bandwidth requirements that are prohibitively expensive or complicated for most entities to implement.

The storage/data 110 can include one or more databases, containers, or the like for memory access. The storage/data 110 can be partitioned such that a given user has dedicated memory space. A service level agreement (SLA) generally defines an amount of uptime, downtime, maximum or minimum lag in accessing the data, or the like.

The client 114 is a compute device capable of accessing the functionality of the cloud infrastructure 112. The client 114 can include a smart phone, tablet, laptop, desktop, a server, television or other smart appliance, a vehicle (e.g., a manned or unmanned vehicle), or the like. The client 114 accesses the resources provided the cloud infrastructure 112. Each request from the client 114 can be associated with an internet protocol (IP) address identifying the client 114, a username identifying a user of the device, a customer identification indicating an entity that has permission to access the cloud infrastructure 112, or the like.

The cloud infrastructure 112 is accessible by any client 114 with sufficient permission. Usually a customer will pay for or otherwise gain permission to access the cloud infrastructure 112 using one or more devices. Since multiple services and multiple clients 114 with different habits can access the cloud infrastructure 112, it is difficult to provide a "one size fits all" security solution. Typically, an attack on the server 102 is different than an attack on the VM 104, which is different than an attack on a container, etc. These different attack vectors are usually handled by instantiating different security techniques at each. Also, these attack vectors can be related, as an attack on a container can be triggered by an impersonation attack, which can be detected by identifying an increase in failed login attempts or abnormal usage of a resource of the cloud infrastructure 112 (relative to the user permitted to access). Further, these typical attacks result in a number of alerts being provided to the customer (a security officer of the customer) without explanation that the alerts regard or might regard a related security breach event. These alerts are generally from disparate sources that have different scope and severity metrics. The security officer is then forced to determine the importance of and relation between the security alerts. With an increasing number of threat vectors, corresponding detection types, or types of resources being accessed in the cloud infrastructure 112 by a customer, the number of alert detection sources, scopes, and metrics increases to become quickly unmanageable.

Embodiments provide a solution to unifying security analysis of these distinct resources and clients. Embodiments provide the unification through a number of improvements to security analysis of resources from the cloud infrastructure 112. One improvement includes a view of potential security breaches of cloud resources that indicate relation therebetween. More detail regarding the view is provided with regard to FIG. 8. Another improvement includes an architecture for learning, in a common multivariate and multilevel context, whether an alert is warranted. More detail regarding the architecture is provided with regard to FIG. 7. The view of the security events can be provided to indicate the results of this learning, thus providing a security officer an efficient view of the alerts that can indicate a more complex kill chain being implemented by the attack.

Figure 3:
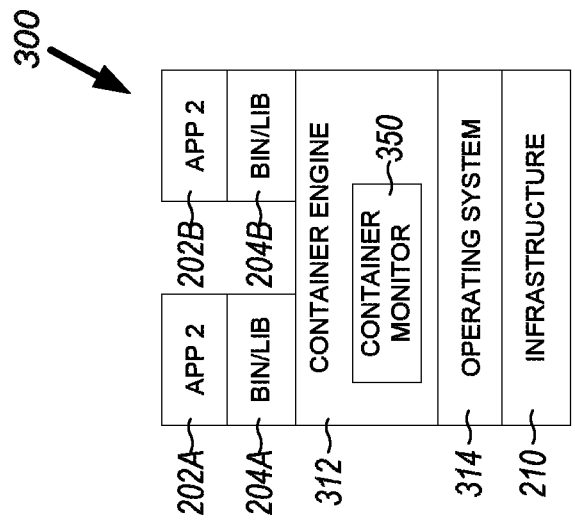
FIG. 3 illustrates, by way of example, a high-level diagram of an embodiment of a container architecture.
Figure 2:
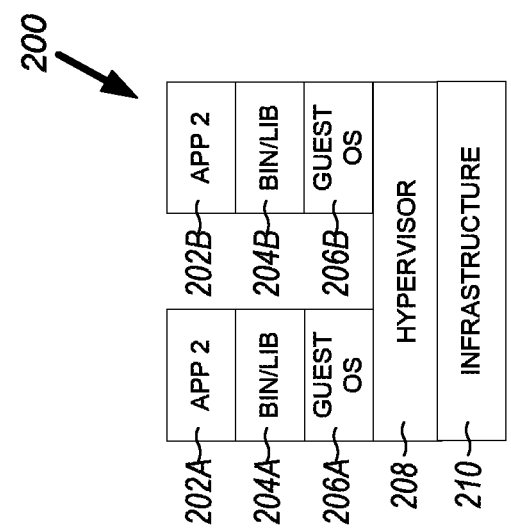
FIG. 2 illustrates, by way of example a high-level diagram of an embodiment of a VM architecture.

FIG. 2 illustrates, by way of example a high-level diagram of an embodiment of a VM architecture 200. FIG. 3 illustrates, by way of example, a high-level diagram of an embodiment of a container architecture 300. These diagrams are provided for background understanding of containers and VMs and to highlight differences between virtual machines (VMs) and containers.

The VM architecture 200 as illustrated includes apps 202A, 202B that depend on respective libraries 204A, 204B for operation. The apps 202A, 202B operate on a respective guest OS 206A, 206B. The guest OSs 206A, 206B operate on a hypervisor 208. The hypervisor 208 can operate on a computer or network infrastructure 210. The guest OS 206A, library 204A, and app 202A form a VM that is virtualized by the hypervisor 208 (sometimes called a virtual machine monitor (VMM)). Each VM includes a unique instance of an OS 206A, 206B. Each VM includes its own binary ("bin") file(s), library file(s), and app(s) that it services. In general, the VM operating on the hypervisor 208 emulates a hardware system.

While the VM architecture 200 has benefits over applications operating on hardware, the VM architecture 200 also has drawbacks as compared to other application deployment architectures. For example, each VM consumes a prohibitively large amount of memory space. This is at least partially due to each OS 206A, 206B operating on a respective VM. The boot time of a VM is prohibitively long due, at least partially, to booting the OS 206A, 206B. VM download times are prohibitively long as well due, at least partially, to the data required for the OS 206A, 206B. Other drawbacks of VMs are not specifically delineated here.

The container architecture 300 overcomes one or more of the drawbacks of the VM architecture 200. In the container architecture 300, the app 202A, 202B uses libraries 204A, 204B and operates on a container engine 312, sometimes called a runtime environment. The container engine 312 is hosted by an OS 314 that operates on the infrastructure 210. A container includes the app 202A-202B and the library 204A-204B, and other configuration files required to operate the app 202A-202B. The container is generally a deployment of a container image.

An attacker attacking the VM of FIG. 2 will likely attack in a different manner than the container of FIG. 3 and can first attack the VM hosting the container to gain access to the container. Further, the detection of the attack occurs using a different resource. For the VM, the VMM (the hypervisor 208) monitors actions of the VM. The hypervisor 208 also provides the functionality of the guest OS 206A-206B. In contrast, the container behavior is monitored by a container monitor 350 which executes using resources of the operating system 314. These are different layers of the computer system and likely include monitoring of different actions, different communications, or the like, to detect an attack. Other differences and nuances exist with other different resources of the cloud infrastructure 112, thus causing different monitors to be used to detect anomalous or malicious behavior being performed using the resource.

Figure 4:
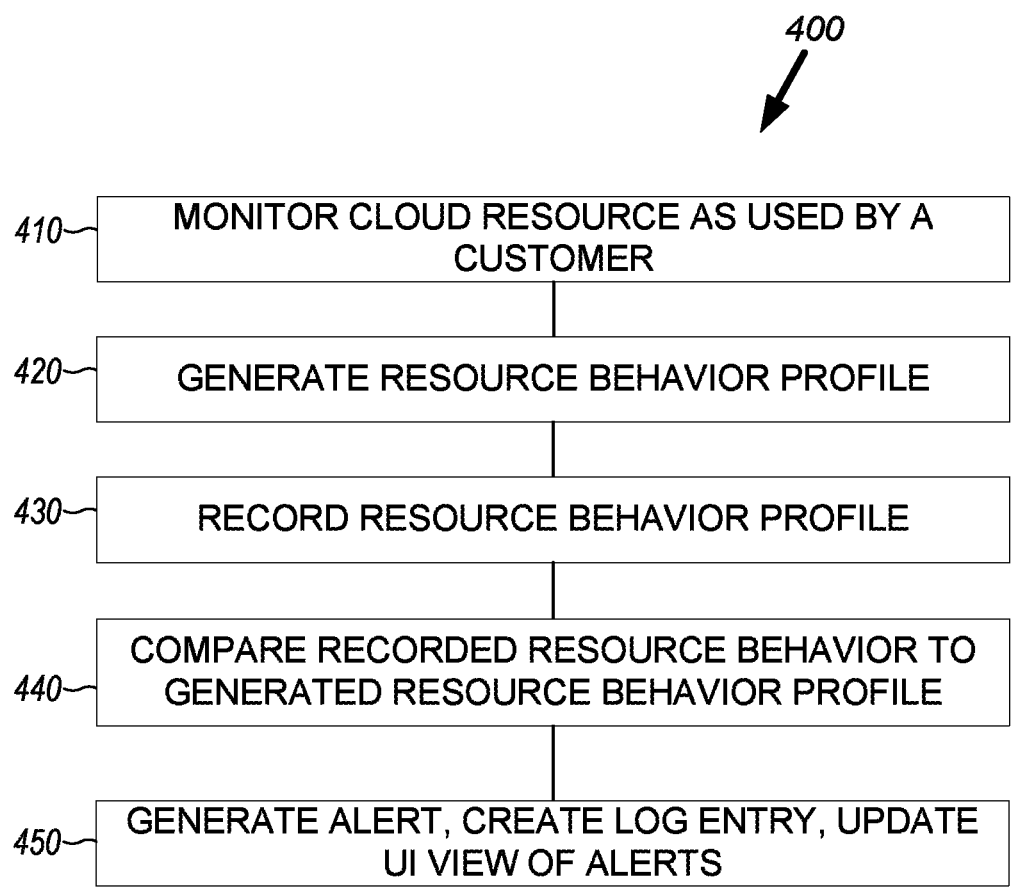
FIG. 4 illustrates, by way of example, a diagram of an embodiment of a method for identification of and response to anomalous resource behavior.

FIG. 4 illustrates, by way of example, a diagram of an embodiment of a method 400 for identification of and response to anomalous resource behavior. The method 400 as illustrated includes monitoring a cloud resource (e.g., a cloud resource, such as the server 102, VM 104, software platform 106, application 108, storage/data 110, or the like) as used by a customer, at operation 410; generating a resource behavior profile for the monitored resource, at operation 420; recording the generated resource behavior profile, at operation 430; comparing recorded resource behavior to the generated resource behavior profile, at operation 440; and generating an alert, creating a log entry, or updating a UI view of alerts, at operation 450. The operation 450 can be performed in response to the comparison at operation 440 indicating the recorded resource behavior is different from the resource behavior profile generated at operation 420.

Cloud technology is widely used by many organizations of various sizes. Cloud resources can be accessed through a network. While some cloud resources are common and used by many different organizations, others are not.

Crowd sourcing aggregates data from multiple users, organizations, or the like. Crowd sourcing techniques may not be sufficient for resources that are less popular. This can be due, at least in part, to having a lack of data to generate a resource behavior profile at operation 420. Therefore, crowdsourcing may be used for resources that are more common. Crowd sourcing can include aggregating the behavior data for some resources across multiple clients.

The operation 410, can include consulting records of metrics indicating consulting historical records of customer resource usage. The records can be at the customer, user, IP address, other level, or a combination thereof.

The operation 420 can include expressing the normal behavior (non-malicious or non-anomalous behavior) of the resource usage. The normal behavior can include a statistically significant majority of the corresponding resources being used in that manner for that client or (in the case of crowdsourcing) across clients that use similar resources.

Figure 5:
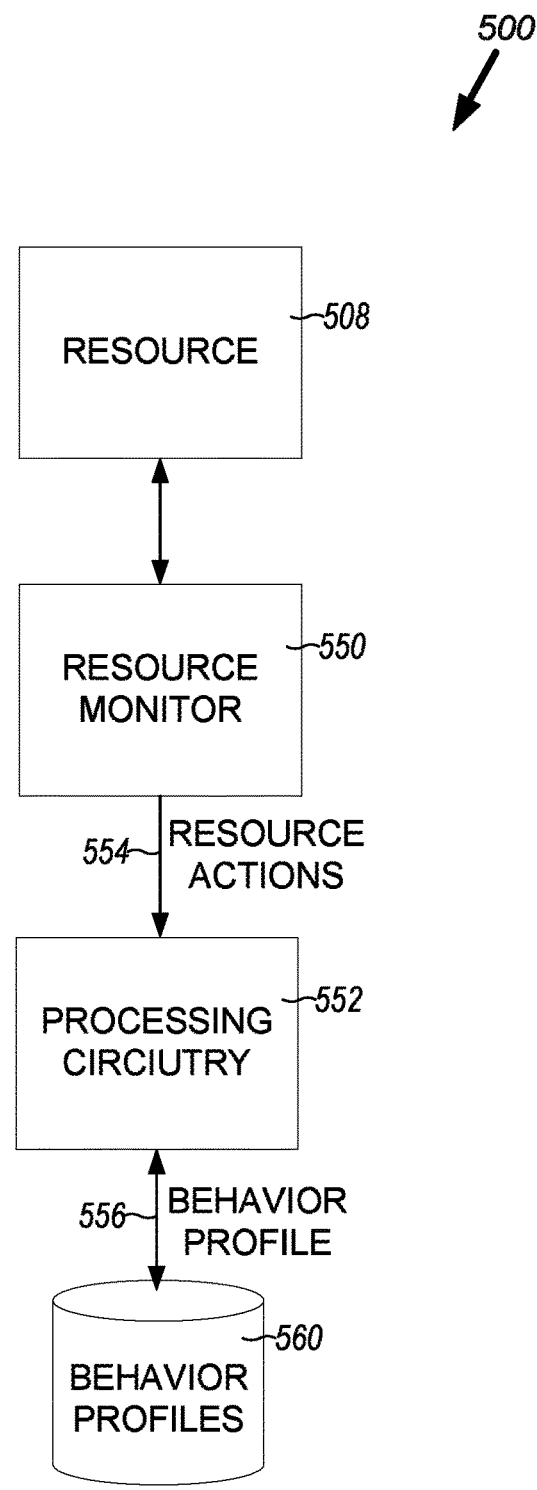
FIG. 5 illustrates, by way of example, a diagram of an embodiment of a system for generating a behavior profile for a resource (e.g., a resource accessible through the cloud).

FIG. 5 illustrates, by way of example, a diagram of an embodiment of a system 500 for generating a behavior profile 556 for a resource 508 (e.g., a resource of the cloud infrastructure 112). The system 500 can perform the operation 420. The behavior profile 556 can be generated by monitoring execution of and access to the resource. The monitored behavior can be associated with an identification that indicates the resource.

A resource monitor 550 (e.g., VMM, container monitor 250, resource agent, or the like) can record resource actions 554 that occur using the resource 308 or that access resources external to the resource 508. The resource actions 554 can include access of the resource 508, access of a port and a corresponding port number, an internet protocol (IP) address of a data or operation request, a read or write to a process, executing a process, issuing or receiving a communication from another device, process bandwidth used, memory space allocated or consumed, time duration of or between specific operations, an output of an application executing in the resource 508, or other resource action.

Processing circuitry 552 can receive the resource actions 554 and generate the behavior profile 556 based on the resource actions 554. The behavior in the behavior profile 556 can include accessing a specific port, reading or writing to a port or process, executing a process, issuing or receiving a communication from another device, processor bandwidth used, memory space allocated or consumed, time duration between specific operations, communications, port accesses, number of times resource is accessed in a certain time period, or the like. The behavior profile 556 of the resource 508 can specify a behavior and, in some embodiments, a percentage of the total number of corresponding resources that exhibit the behavior. For some behaviors, a mean and deviation (e.g., standard deviation, variance, normal range, or the like) of all or a subset of the resources 508 can be determined and used as part of the behavior profile 556. The behavior profile 556 of a resource 508 can include one or more of the following entries:

[(port $x_0$, percentage), (port $x_1$, percentage), . . . (port $x_{n-1}$, percentage)]
[(process $y_0$, percentage), (process $y_1$, percentage), . . . (process $y_{n-1}$, percentage)]
[(comm. $z_0$, percentage), (comm. $z_1$, percentage), . . . (comm. $z_{n-1}$, percentage)]
[(processor bandwidth, deviation)]
[(memory allocated, deviation)]
[(memory consumed, deviation)]
[(time between processes $y_0$ and $y_1$, deviation)]

One way to generate a profile is by defining profile's properties (used ports, executed processes, network communication. CPU bandwidth, memory bandwidth, communication bandwidth, number of accesses, IP addresses allowed to access, number of executions, average time between accesses or executions, or the like). The operation 420 can include determining statistical expected values and boundaries for one or more properties. For example, for a given resource ~20% of deployments are using only port 20 and 80% only port 21. This defines the expected value for that property. Another method is by using machine learning methods for example one class classifier model where the predictor knows to classify each new instance as belonging to the class or not.

The operations 410 and 420 are part of the behavior profile generation and can be offline operations. The remainder of the operations 430, 440, and 450 are part of behavior monitoring and can be runtime operations.

The operations 410 and 420 can be performed periodically (e.g., daily, weekly, monthly, etc.) or by another trigger, such as a user request, memory usage, or the like. For example, every time a specified amount of new resource behavior data is uploaded to a cloud provider, after a specified number of new resource behavior actions are uploaded, or the like.

Figure 6:
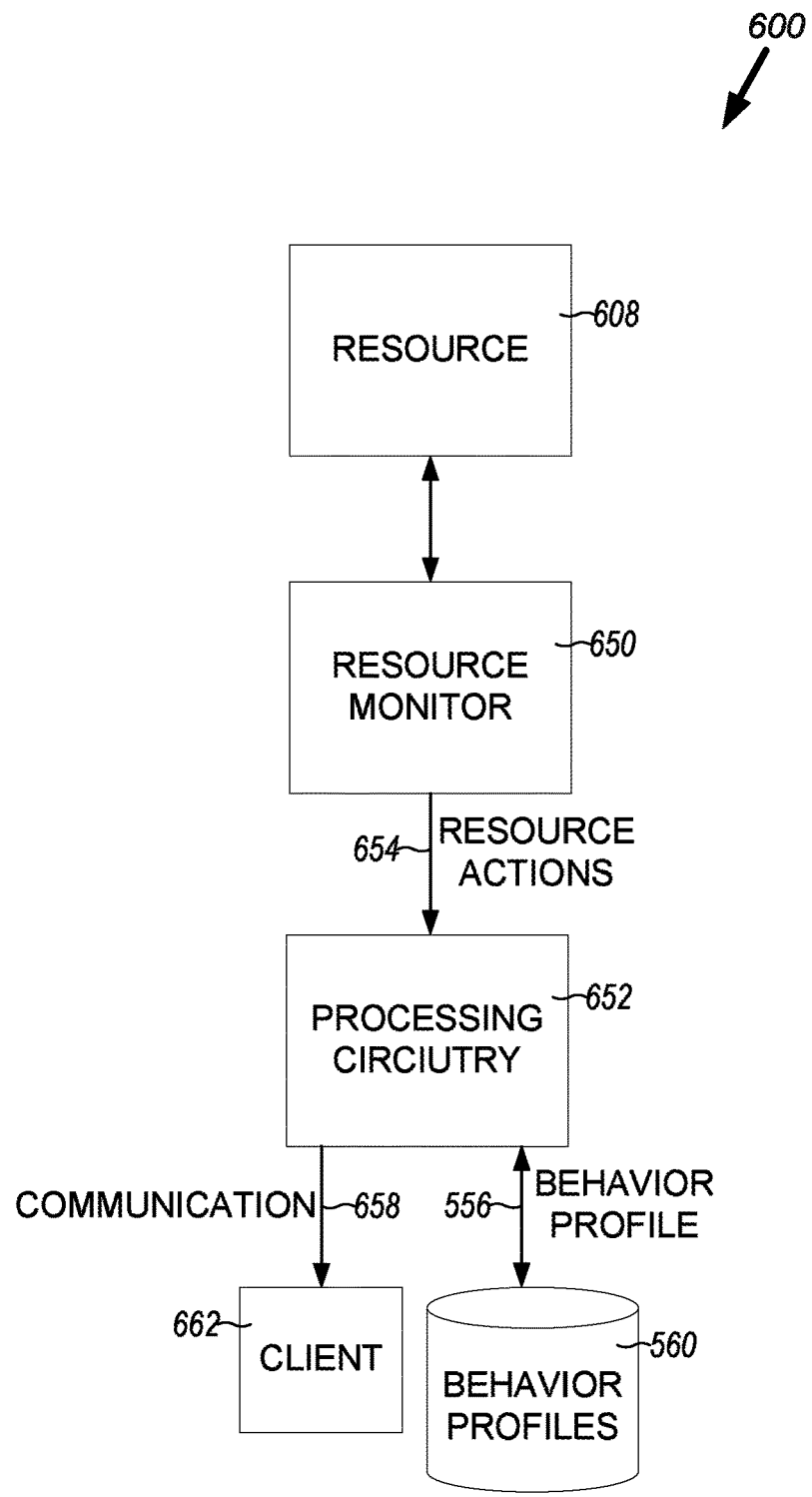
FIG. 6 illustrates, by way of example, a diagram of an embodiment of a system for behavior monitoring.

FIG. 6 illustrates, by way of example, a diagram of an embodiment of a system 600 for behavior monitoring (performing operations 430, 440, or 450). The system 600 as illustrated includes a deployed resource 608 (e.g., same or different as the resource 508), a resource monitor 650 (e.g., a same or different monitor as the monitor 550), and processing circuitry 652 (e.g., a same or different from the processing circuitry 552).

The operation 430 can include using a resource monitor 550 (e.g., the same or different resource monitor as the one that recorded the resource actions 554 used to generate the behavior profile 556) to recorded resource actions 654 of the resource 608 after the behavior profile 556 for the resource 608 has been generated. The recorded resource actions 654 can be provided to the processing circuitry 652 (same or different processing circuitry as generated the behavior profile 556).

The operation 440 can include filtering resource actions 654 of the resource 608 to include only types of behaviors that are in a corresponding behavior profile 556 for the resource 608. For example, if a behavior profile 560 includes only a port access entry, the process calls, temporal data, and other behavior of the resource actions 654 that are not port accesses can be filtered, such as by the processing circuitry 652. The filtering can reduce compute time and memory requirements for the comparison.

The operation 440 can include training an ML container classifier on properly operating resources (e.g., at operation 420) and classifying resource actions 654 from the resource monitor 650 of a deployed resource. The ML resource classifier can be used as the behavior profile 560 for the resource 608. The ML resource classifier can return a label for resource actions that indicate "normal" or "abnormal" and a confidence level.

The operation 440 can include comparing resource actions 654, or data derived from the resource actions 654, to rules defining normal container behavior as defined in a corresponding behavior profile 556. The data derived from the resource actions 654 can include time between actions, such as a time between a port access, a process execution, or the like, number of accesses or executions in a specified period of time, a time of day at which access or execution generally occurs, or the like. The data derived from the resource actions 654 can include memory usage, processing circuitry bandwidth usage, or the like.

The operation 450 can include issuing an alert 658 to a device 662 (e.g., the client 114). The operation 450 can be performed in response to a determination, at operation 440, that the behavior of the resource 608, as indicated by the resource actions 654, is abnormal or breaks a rule as defined by the behavior profile 556. The alert 658 can include data uniquely identifying the resource 608 that is subject of the alert, the resource action(s) 654 that are considered abnormal, a time of the resource action(s) 654, a location (e.g., server identification, geographical location (e.g., of a colocation center or the like), or the like) of the infrastructure 210 on which the resource 608 is operating, or the like. Other data that can be provided in an alert 658 includes data from the event stream 702 (see FIG. 7).

The device 662 can be associated with a user in charge of maintaining the resource 608. The device 662 can include a smartphone, computer, tablet, laptop, smartwatch, and the alert can include a text, phone call, a direct message communication, or other communication. In some embodiments, the device 662 can include an email server, or the like, through which a user can be notified by email or other communication.

The operation 450 can include blocking operation of a running resource, auditing resource actions to log or alert the customer. A user can configure their alert preferences for operation 450. For example, a user can indicate whether they want to block/unblock a resource 608, be notified via email or text (e.g., simple messaging service (SMS)), be notified only on high confidence alerts, be notified of a maximum number of alerts per day or other time period or be notified only on images of a specified type, among other configuration options.

A behavior profile 556 can be generated for each of a number of levels of a resource. For example, consider a database resource accessible through the cloud infrastructure 112. To access the database resource, a user can be required to first access a resource that is a cluster of servers, a resource that is a specific server in the cluster, and the database resource on the specific server. These resources are hierarchical and an alert that is generated for access to the database resource is likely to have an associated alert generated for the associated server and the cluster. The database profile, in this example, can be considered to be at a higher level than a profile of the server, which can be considered to be at a higher level than a profile of the cluster.

A behavior profile 556 can be generated for each user, group of users (e.g., an organization or customer), device (e.g., IP address), group of devices, or a combination thereof. These behavior profiles (sometimes called entity behavior profiles) are similarly hierarchical. That is, an IP address is associated with one or more users, which is associated with a customer or a group of users. For each IP address that was associated with an alert, likely an alert will be generated for a user (a principal profile) and a customer. Thus, for a single violation of a database behavior profile multiple alerts can be generated.

For example, for a cloud data storage customer, a profile hierarchy (in order of lower granularity to higher granularity) can include: storage account, storage container, source application, source IP address, and principal. Thus, a profile hierarchy can include one or more resource profiles, one or more entity profiles, or a combination thereof.

Embodiments are discussed that can aggregate the alerts likely associated with a same attack and reduce the number of alerts provided at operation 450. This can reduce the confusion and complexity of managing the cloud resources.

Figure 7:
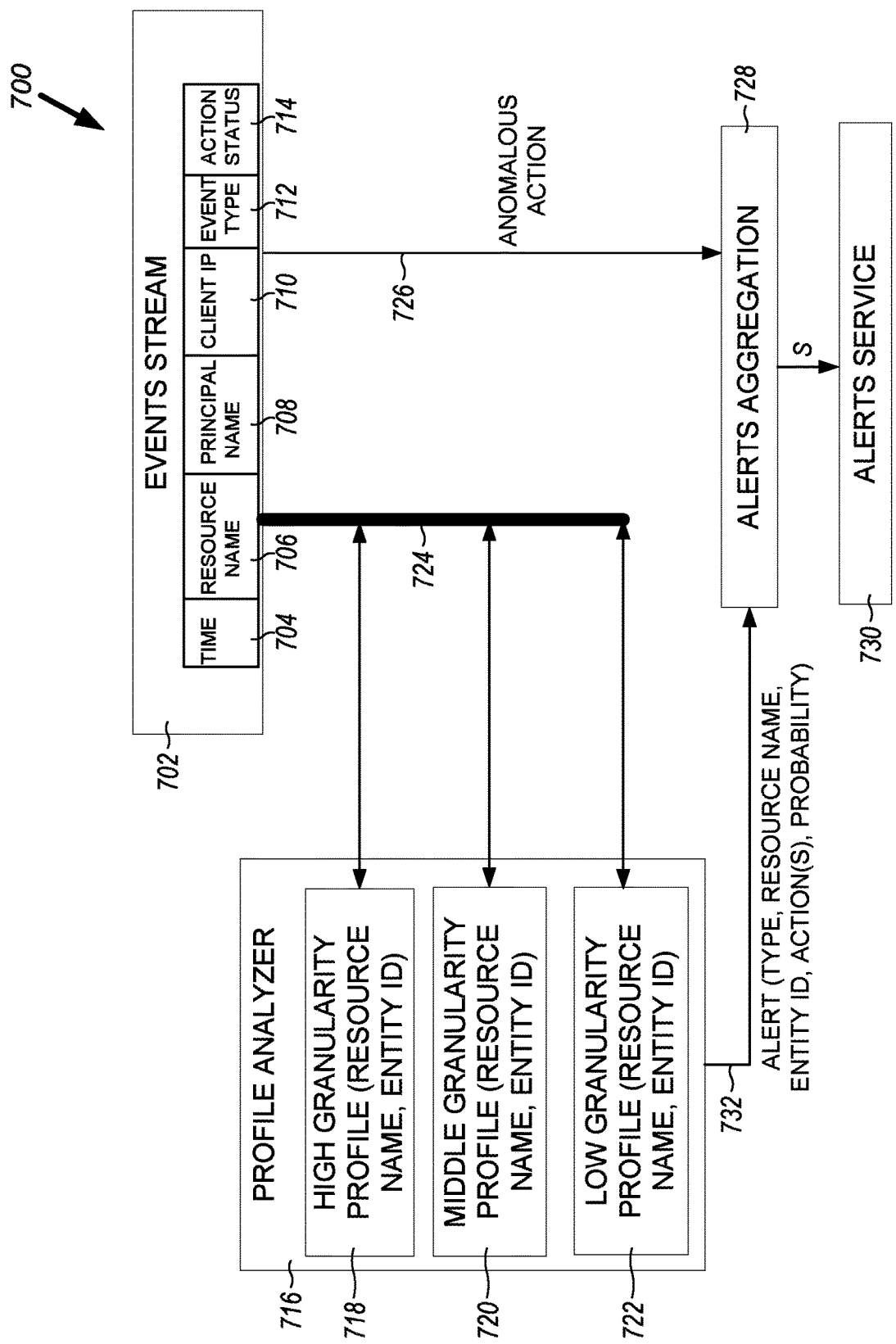
FIG. 7 illustrates, by way of example, a diagram of an embodiment of a system for alert management.

FIG. 7 illustrates, by way of example, a diagram of an embodiment of a system 700 for alert management. The system 700 as illustrated includes an events stream 702, a profile analyzer 716, an alerts aggregation unit 728, and an alerts service 730. The events stream 702 can be generated using a resource monitor 550, 650 or the like.

In general, the events stream 702 indicates actions of or communications to a resource, or other behavior affecting the resource. In some embodiments, the events stream 702 can generate resource action data (e.g., in a packet, data stream, or the like). The resource action data can include one or more of a time 704 at which the behavior was performed, a resource name 706 (identification uniquely identifying the resource), a principal name 708 (e.g., a username or other identification uniquely identifying the entity causing the behavior to be performed), a client IP address 710 through which the behavior is being performed, an event type 712 (e.g., data read request, execution request, data write request, email retrieval or send, file read or write request, or the like), or an action status 714 (e.g., whether the behavior was blocked, allowed, being analyzed further, or the like).

The profile analyzer 716 as illustrated include a high granularity profile 718, a middle granularity profile 720, and a low granularity profile 722. The middle granularity profile 720 is more granular than the low granularity profile 722 and less granular than the low granularity profile 722. The profile analyzer 716 can operate on data from the events stream 702 with a specific subset of resource name(s) 706 and principal name(s) 708 or IP address 710. The profile analyzer 716 can include a bus sniffer that filters data to a corresponding profile 718, 720, 722 for analysis. The filter can direct data from the events stream 702 that includes (1) a resource name 706 that matches a resource name associated with the profile 718, 720, 722 or (2) a principal name or client IP address 710 that matches an entity ID associated with the profile 718, 720, 722.

The profile analyzer 716 can be a part of the processing circuitry 652. The profile analyzer 716 can compare the data from the events stream 702 to the profile 718, 720, 722 to which the data corresponds and generate an alert 732 if the comparison indicates an anomalous or harmful behavior. The alert 732 can be associated with a probability that indicates a likelihood that an anomalous, harmful, or other behavior that warrants attention has been detected. The alert can further include the data of the event stream that caused the alert to be issued, a type of adverse behavior detected (e.g., data volume anomaly, IP anomaly, activity time anomaly, principal name anomaly, login failure anomaly, or the like).

The alerts aggregation unit 728 can be implemented using the processing circuitry 652. The alerts aggregation unit 728 can, for each resource, user, customer, client, or a combination thereof, determine a normalized probability score, S. The normalized probability score can be based on a series of profiles built based on the historical, normal, non-adverse behavior of the entity (e.g., resource, device, or other). Then, the current behavior being detected can be compared to historical behavior of this entity, and of all entities that are associated with the current entity and at a higher level (lower granularity) in the hierarchy than the current profile (using the profile analyzer 716).

For example, if a behavior is associated with the high granularity profile 718, that same behavior can be propagated to the middle granularity profile 720 and the low granularity profile 722. However, the opposite flow is not performed. Thus, if a behavior is associated with the low granularity profile 722, that behavior does not flow to the middle granularity profile 720 or the high granularity profile 718. If a user accesses a cluster, that does not mean that all higher-level server profiles are affected by the access. Consider a container storage access example and consider data received that is associated with a high granularity profile (e.g., an IP address), this behavior can be propagated to a specific container profile of all users of that container, and behavior of all IP entities over that account.

The alerts aggregation unit 728 can use an ML technique to detect a signal patterns across multiple cloud resources. This has at least two benefits: (1) Compound detection: This allows detection of stable patterns of events, each of which is rare and anomalous, but they tend to appear together. This might reflect different stages in the kill chain of an attack while still differentiating these malicious events from irrelevant statistical anomalies—without relying on predefined known rules. For example, a data exfiltration attack at a container and IP level and fuzzing attempt at a container level are individually rare, but all three of these anomalies tend to appear together. (2) Scalability: Even in the concise matrix representation, the representation of individual alerts is not scalable. As mentioned above, in case of 5 types of alerts at 3 profile levels, there are 24 possible alerts; in case of 7 types of alerts at 6 profile levels this number increases to 147—which can't be efficiently monitored by a human. Aggregating simple alerts to compound ones decreases the number of alerts drastically by moving to a 'digestible' format.

The alerts aggregation unit 728 can detect 'rare but stable' events, meaning events that are rare (occur less than a threshold number of times over a specified time period), but tend to appear together. Stable means the event is required for differentiating between statistical anomalies (unstable events) which are not related to security. These anomalies can be caused by random technical failures or maintenance events. An attack scenario or malicious process includes activities which are not usual for a specific resource, but the same pattern can be recognized when attacks against multiple resources are considered (e.g., attacks against different customers or resources in a cloud service setting) that occur concurrently with a threshold probability are stable events.

The alerts aggregation unit 728 identifies groups of events (the alert 732 or anomalous action 726), such that the probability of each individual event is below a predefined threshold, however the probability of intersection of these events is significantly higher than what would be expected if these events were independent. Thus, if the event does not occur in conjunction with an associated event, the event is not considered to be the subject of an alert. That is, if the event does not occur within a specified time of another corresponding event that is determined to be associated with an attack event, the event can be considered anomalous and not be the subject of an alert.

An event in this context is an anomaly with the parameters of {E, H, D} as described above. In the context of the interface 800, an alert can include "data exfiltration by IP at storage container level". In some embodiments, for events X, Y, consider $P(X)<a$ and $P(Y)<a$ (where a is a pre-defined probability threshold), and $P(X^\wedge Y)/(P(X)*P(Y))\gg 1$ (where $X^\wedge Y$ stands for intersection of X and Y). In other embodiments, a deep learning technique or probability graph can be used to determine whether separate events or operations are related.

Filtering by these requirements provides events and calculated metrics. The events and metrics can be enriched by weighting the events based on a number of events in each group, scope (e.g., the level of hierarchical profile it relates to), time gaps between different events, or severity score for each type of included alert. Over this weighted list, a number of methods—either domain expertise or other techniques— can be performed, such as to find a most concise, relevant, or important group of one or more events. The events can be surfaced as one or more compound security alert. A compound security alert is a single alert that relates to respective alerts detected to resources at multiple levels.

The result of this is a normalized anomaly score S, generated by the alerts aggregation unit 728, in the form of: S (E, H, D)=s, where E is the current entity. H is the historical model (profile) of the entity and D is the type of alert.

For example, the statement S (IP, container, exfiltration) =0.9 means that the anomaly score for activity coming from a specific IP address compared to historical activity at that container in terms of a data exfiltration anomaly type has a high anomaly score of 0.9.

This S score thus aggregates alerts in a hierarchy into a single alert provided to an alerts service 730. This greatly reduces the number of alerts generated. In some examples, an alert generated at a low granularity profile 722 can evolve into an alert generated at a middle granularity profile 720 and so on. This evolution and the associated resource names and entity IDs indicate an attack chain of the adverse behavior and does not increase the number of alerts provided for a same kill chain as it evolves.

Some data from the events stream 702 can be deemed so important and worthy of alert regardless of analysis by the profile analyzer 716. This data can be considered to be associated with an anomalous action 726 and provided to the alerts aggregation unit 728. Examples of such anomalous action 726 is a login failure (or a number of repeated login failures) or the like.

The alerts aggregation unit 728 can use a neural network (NN) or non-NN ML technique to determine whether alerts are related and can be combined. In a non-NN ML technique a provider can monitor behavior of a customer. The behavior can be compared to behavior of one or more other customers to decide whether there is a pattern that was seen at a previous customer. The non-NN ML technique can thus use crowdsourcing comparisons to determine whether an alert is to be generated or if an alert can be combined. In an NN technique, a general matrix analysis (NN) can be performed using an NN trained on behavior of one or more customers.

Figure 8:
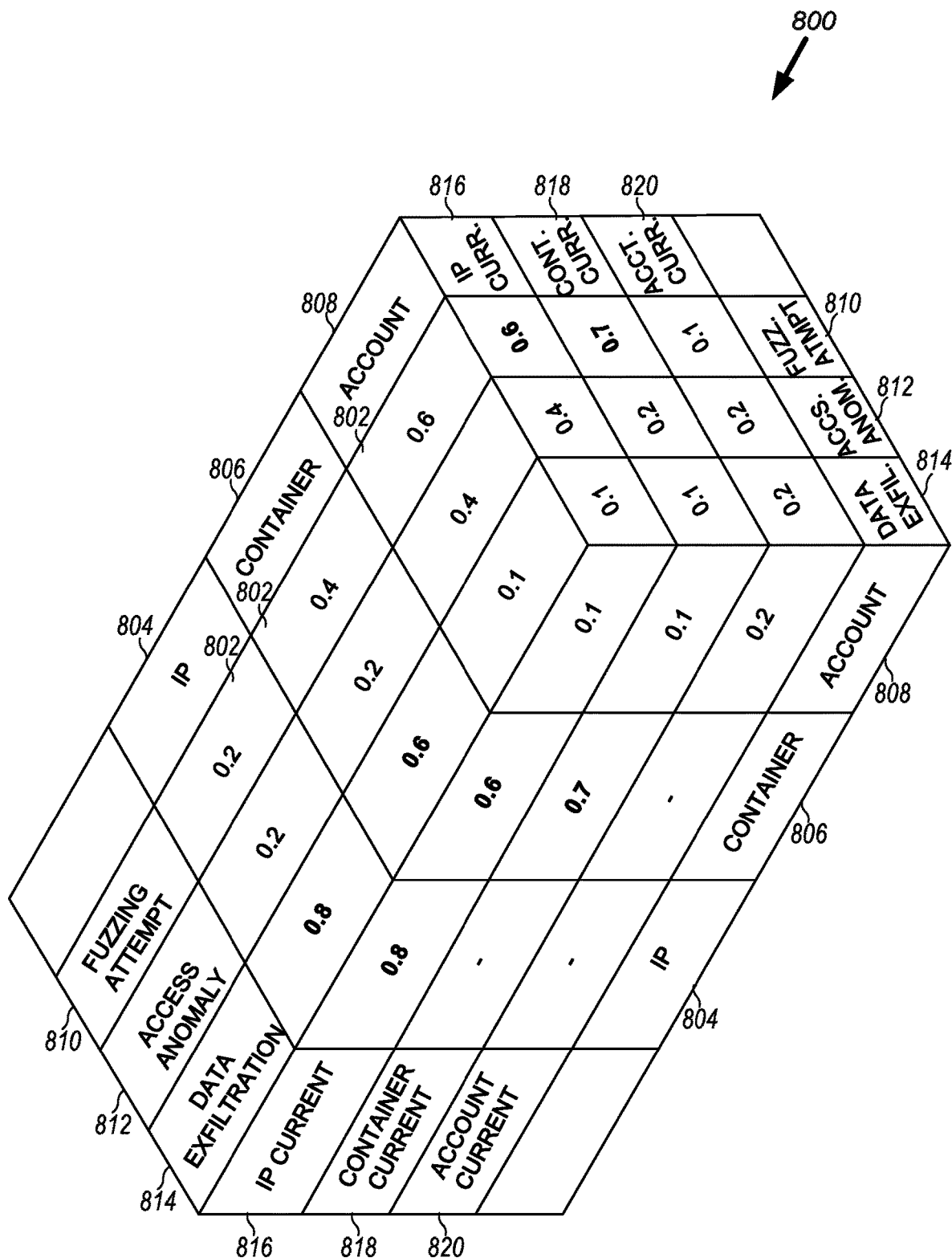
FIG. 8 illustrates, by way of example, a diagram of an embodiment of an interface.

FIG. 8 illustrates, by way of example, a diagram of an embodiment of an interface 800. To help a user efficiently understand the progress and current state of their cloud resources, a new interface can help. The interface 800 helps inform the user's understanding of the state of their cloud resources.

Based on the notation of S, a stateful anomaly can be represented on a 3-dimensional array (on the interface 800) with the dimensions of {E, H, D}, where each cell 802 of the array holds a corresponding value of S. In FIG. 8, the entries in the cells 802 can be filtered by a minimal threshold (e.g., greater than (or equal to) 0.4, 0.5, 0.6, 0.7, 0.8, 0.9, a greater or lesser number, or some number therebetween). The filtering operation can leave a more sparse representation with potential security alerts (in bold) and not including other entries.

Each entry in the array is associated with a source entity, target resource, and anomaly type. In the example illustrated there are three source entities, namely IP address 804, container 806, and account 808. In the example illustrated there are three anomaly types, namely data exfiltration 810, access anomaly 812, and fuzzing attempt 814. In the example illustrated there are three target resources, namely current IP address, current container, and current account.

The interface 800 can present the anomalies to the security officer (as a simplified layered matrix), with the benefit of being a concise, unified, and easily extendable format. This interface 800 can help improve officer's attention and easy understanding of security information in large scale environments with multiple resources.

Presenting the anomalous data using the interface 800 allows distinguishing different scenarios based on values in related cells. For example, one can distinguish between a brute force attack scenario coming from a single IP (high anomaly score in a {IP, server, BF} cell 802), and distributed BF attack, coming from multiple IPs attacking the same server (high anomaly score in a {server, server, BF} cell 802).

In general, embodiments can be implemented by one or more devices of a cloud service security provider, such as for Azure cloud computing from Microsoft Corporation of Redmond, Wash., United States. As previously discussed, the cloud service provides access to machines, containers, VMs, or the like. Embodiments provide all different levels of security alerts. Embodiments can aggregate alerts from different sources. Sources depend on the resource in question (one customer can have a storage account and VMs in their environment, another customer can have ML centers and applications). Regardless, all related resources in the environment can be connected in a matrix. Embodiments can include determining how connections between resources behaves in a normal way. This data can be indexed by IP address, customer identification, or the like, in a database. The database data can be used to generate a profile (or model) of resource behavior. The models can include a number of metrics (average traffic level, how the user connects (device used to connect, times at which the user connects, OS used to connect, or the like), number of files or other amount of data downloaded, whether the IP address was used to access the resource previously, or the like.

Different states can be defined for different resource and customer combinations and reflect the interaction between a respective customer and a respective resource. The state might be connecting an IP address to a database (metrics regarding amount of traffic, in certain time customer accesses X records). In other words, the state can be an expected behavior.

Figure 9:
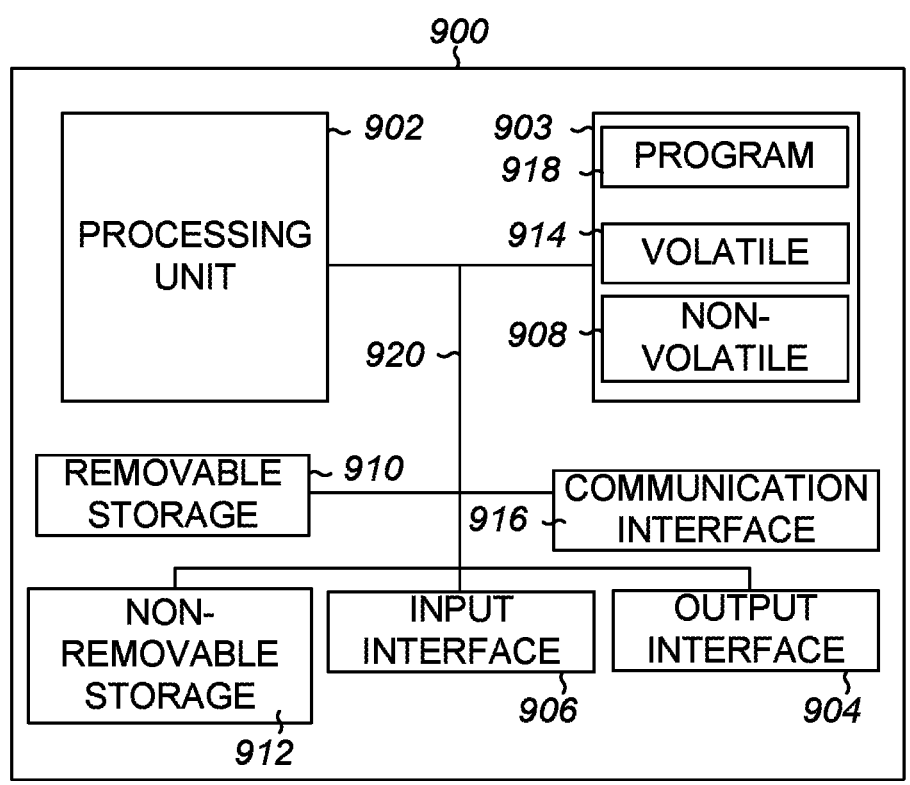
FIG. 9 illustrates, by way of example, a block diagram of an embodiment of a machine (e.g., a computer system) to implement one or more embodiments.

FIG. 9 illustrates, by way of example, a block diagram of an embodiment of a machine 900 (e.g., a computer system) to implement one or more embodiments. One example machine 900 (in the form of a computer), can include a processing unit 902, memory 903, removable storage 910, and non-removable storage 912. Although the example computing device is illustrated and described as machine 900, the computing device may be in different forms in different embodiments. For example, the computing device be part of a smartphone, laptop, desktop, tablet, smartwatch, or other computing device including the same or similar elements as illustrated and described regarding FIG. 9. One or more resources of the cloud (e.g., the server 102, VM 104, software platform 106, applications 108, storage/data 110, the client 114, hypervisor 208, infrastructure 210, guest OS 206A-206B, binary/library 204A-204B, applications 202A-202B, the OS 314, container engine 312, container monitor 350, the method 400, the resource 508, the resource monitor 550, the processing circuitry 552, the resource 608, the resource monitor 650, the processing circuitry 652, the client 662, the profile analyzer 716, the alerts aggregation unit 728, the alerts service 730, or the UI 800 or other component can be implemented using or include one or components of the machine 900. Further, although the various data storage elements are illustrated as part of the machine 900, the storage may also or alternatively include cloud-based storage accessible via a network, such as the Internet.

Memory 903 may include volatile memory 914 and non-volatile memory 908. The machine 900 may include— or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 900 may include or have access to a computing environment that includes input 906, output 904, and a communication connection 916. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to the machine 900, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 902 of the machine 900. A hard drive, CD-ROM, and RAM are some examples of articles including a non-transitory computer-readable medium such as a storage device. For example, a computer program 918 may be used to cause processing unit 902 to perform one or more methods or algorithms described herein.

Some embodiments can be implemented using, at one or more operations, aspects of artificial intelligence (AI), including or processing and inferences performed using machine learning (ML) or neural networks (NNs). AI is a field of technology concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process (sometimes including ML) is used to arrive at appropriate weights. NN designers typically choose a number of neuron layers or specific connections between layers including circular connection. Instead, a training process generally proceeds by selecting initial weights, which may be specifically or randomly selected. Training data is fed into the NN and results are compared to an objective function that provides an indication of error. The error indication is a measure of how wrong the NN's result is compared to an expected result. This error is then used to correct the weights. Ove iterations, the weights can collectively converge to encode the operational data into the NN. This process may be called an optimization of the objective function (e.g., a cost or loss function), whereby the cost or loss is reduced or even minimized.

A gradient descent technique can be used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight can move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large or small step sizes.

Backpropagation is a technique whereby training data is fed forward through the NN-here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD). Adam, etc.

What follows is a description of Examples to help aid understanding of disclosed subject matter:

Example 1 includes a system for security of cloud resources, the system comprising a memory device including profiles thereon, each profile of the profiles detailing non-anomalous behavior of a client interaction with a cloud resource of the cloud resources, wherein each profile is associated with a granularity level and each profile at a higher granularity level than a lowest granularity level is associated with a lower granularity profile, the lower granularity profile associated with a different cloud resource of the cloud resources that must be accessed to perform the operation on the cloud resource, processing circuitry coupled to the memory, the processing circuitry to perform operations comprising identifying the profile of the profiles associated with event data, the event data regarding an operation performed on the cloud resource and including data identifying the cloud resource of the cloud resources that is a destination of the operation and the client that is a source of the operation, determining whether the event data is associated with anomalous customer interaction with the cloud resource, in response to determining the event data is associated with anomalous customer interaction, identifying whether another cloud resource of the cloud resources with a lower granularity profile that is associated with the profile of the cloud resource has previously been determined to be a target of an anomalous operation, and providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

In Example 2, Example 1 can further include before identifying the profile associated with the event data, determining whether an event type of the event data indicates the event data indicates anomalous behavior; and determining whether another cloud resource of the cloud resources with a lower granularity profile that is associated with the profile of the cloud resource has previously been determined to be a target of an anomalous operation in response to determining the event type indicates anomalous behavior.

In Example 3, Example 2 can further include, wherein the event type is a failed login.

In Example 4, at least one of Examples 1-3 can further include, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity.

In Example 5, Example 4 can further include, wherein the operations further comprise comparing the score to a minimum threshold and refraining from presenting the score on the view in response to determining the score is less than the minimum threshold.

In Example 6, at least one of Examples 1-5 can further include, wherein, identifying whether another cloud resource of the cloud resources with a lower granularity profile that is associated with the profile of the cloud resource has previously been determined to be a target of an anomalous operation includes using a machine learning technique configured to classify anomalous operations into a single malicious attack type.

In Example 7, at least one of Examples 1-6 can further include, wherein the operations further include identifying an entity associated with the event data and comparing an operation associated with the event data to an entity profile for the identified entity and any entity profiles with a lower granularity than the entity profile that is associated with the entity.

In Example 8, at least one of Examples 1-7 can further include determining whether the event data is associated with anomalous customer interaction with the cloud resource includes determining that a likelihood of the customer performing an operation associated with the event is less than a threshold probability based on the profile.

In Example 9, Example 8 can further include, wherein identifying whether another cloud resource of the cloud resources with a lower granularity profile that is associated with the profile of the cloud resource has previously been determined to be a target of an anomalous operation includes determining that a likelihood of the customer performing an operation associated with the event is less than a threshold probability based on the lower granularity profile.

Example 10 includes a non-transitory machine-readable medium including instructions that, when executed by a machine, cause the machine to perform operations for cloud resource security, the operations comprising identifying a profile of profiles associated with event data, the event data regarding an operation performed on a cloud resource of cloud resources and including data identifying the cloud resource that is a destination of the operation and the client that is a source of the operation, wherein, each profile of the profiles details non-anomalous behavior of a client interaction with a cloud resource of the cloud resources, wherein each profile is associated with a granularity level and each profile at a higher granularity level than a lowest granularity level is associated with a lower granularity profile, the lower granularity profile associated with a different cloud resource of the cloud resources that must be accessed to perform the operation on the cloud resource, determining whether the event data is associated with anomalous customer interaction with the cloud resource, in response to determining the event data is associated with anomalous customer interaction, identifying whether another cloud resource of the cloud resources with a lower granularity profile that is associated with the profile of the cloud resource has previously been determined to be a target of an anomalous operation, and providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

In Example 11, Example 10 can further include, wherein the operations further include before identifying the profile associated with the event data, determining whether an event type of the event data indicates the event data indicates anomalous behavior; and determining whether another cloud resource of the cloud resources with a lower granularity profile that is associated with the profile of the cloud resource has previously been determined to be a target of an anomalous operation in response to determining the event type indicates anomalous behavior.

In Example 12, Example 11 can further include, wherein the event type is a failed login.

In Example 13, at least one of Examples 10-12 can further include, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity.

In Example 14, Example 13 can further include, wherein the operations further comprise comparing the score to a minimum threshold and refraining from presenting the score on the view in response to determining the score is less than the minimum threshold.

In Example 15, at least one of Examples 10-14 can further include, wherein identifying whether another cloud resource of the cloud resources with a lower granularity profile that is associated with the profile of the cloud resource has previously been determined to be a target of an anomalous operation includes using a machine learning technique configured to classify anomalous operations into a single malicious attack type.

In Example 16, at least one of Examples 10-15 can further include, wherein the operations further include identifying an entity associated with the event data and comparing an operation associated with the event data to an entity profile for the identified entity and any entity profiles with a lower granularity than the entity profile that is associated with the entity.

In Example 17, at least one of Examples 10-16 can further include determining whether the event data is associated with anomalous customer interaction with the cloud resource includes determining that a likelihood of the customer performing an operation associated with the event is less than a threshold probability based on the profile.

In Example 18, Example 17 can further include, wherein identifying whether another cloud resource of the cloud resources with a lower granularity profile that is associated with the profile of the cloud resource has previously been determined to be a target of an anomalous operation includes determining that a likelihood of the customer performing an operation associated with the event is less than a threshold probability based on the lower granularity profile.

Example 19 includes a method for cloud resource security, the method comprising identifying a profile of profiles associated with event data, the event data regarding an operation performed on a cloud resource of cloud resources and including data identifying the cloud resource that is a destination of the operation and the client that is a source of the operation, wherein, each profile of the profiles details non-anomalous behavior of a client interaction with a cloud resource of the cloud resources, wherein each profile is associated with a granularity level and each profile at a higher granularity level than a lowest granularity level is associated with a lower granularity profile, the lower granularity profile associated with a different cloud resource of the cloud resources that must be accessed to perform the operation on the cloud resource, determining whether the event data is associated with anomalous customer interaction with the cloud resource, in response to determining the event data is associated with anomalous customer interaction, identifying whether another cloud resource of the cloud resources with a lower granularity profile that is associated with the profile of the cloud resource has previously been determined to be a target of an anomalous operation, and providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

In Example 20, Example 19 can further include, before identifying the profile associated with the event data, determining whether an event type of the event data indicates the event data indicates anomalous behavior; and determining whether another cloud resource of the cloud resources with a lower granularity profile that is associated with the profile of the cloud resource has previously been determined to be a target of an anomalous operation in response to determining the event type indicates anomalous behavior.

In Example 21, Example 20 can further include, wherein the event type is a failed login.

In Example 22, at least one of Examples 19-21 can further include, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity.

In Example 23, Example 22 can further include comparing the score to a minimum threshold and refraining from presenting the score on the view in response to determining the score is less than the minimum threshold.

In Example 24, at least one of Examples 19-23 can further include, wherein identifying whether another cloud resource of the cloud resources with a lower granularity profile that is associated with the profile of the cloud resource has previously been determined to be a target of an anomalous operation includes using a machine learning technique configured to classify anomalous operations into a single malicious attack type.

In Example 25, at least one of Examples 19-24 can further include identifying an entity associated with the event data and comparing an operation associated with the event data to an entity profile for the identified entity and any entity profiles with a lower granularity than the entity profile that is associated with the entity.

In Example 26, at least one of Examples 19-25 can further include determining whether the event data is associated with anomalous customer interaction with the cloud resource includes determining that a likelihood of the customer performing an operation associated with the event is less than a threshold probability based on the profile.

In Example 27, Example 26 can further include, wherein identifying whether another cloud resource of the cloud resources with a lower granularity profile that is associated with the profile of the cloud resource has previously been determined to be a target of an anomalous operation includes determining that a likelihood of the customer performing an operation associated with the event is less than a threshold probability based on the lower granularity profile.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system for security of cloud resources, the system comprising:
   a memory device including profiles thereon, each profile of the profiles detailing non-anomalous behavior of a client interaction with a cloud resource of the cloud resources, wherein each profile is assigned a granularity level of a plurality of granularity levels, where each profile specifies a different cloud resource of the cloud resources, each higher granularity profile of the profiles assigned to each granularity level above a lowest granularity level is associated with a lower granularity profile of the profiles, a cloud resource specified by the lower granularity profile must be accessed to perform an operation on a cloud resource of the higher granularity profile;
   processing circuitry coupled to the memory, the processing circuitry to perform operations comprising:
   identifying the profile of the profiles associated with event data, the event data regarding an operation performed on the cloud resource and including data identifying the cloud resource of the cloud resources that is a destination of the operation and the client that is a source of the operation;
determining whether the event data is associated with anomalous customer interaction with the cloud resource;
in response to determining the event data is associated with anomalous customer interaction, identifying another cloud resource of the cloud resources with a lower granularity profile that is associated with the profile of the cloud resource and whether the another cloud resource has previously been determined to be a target of an anomalous operation; and
providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

2. The system of claim 1, wherein the operations further include:
before identifying the profile associated with the event data, determining whether an event type of the event data indicates the event data indicates anomalous behavior; and
determining whether another cloud resource of the cloud resources with a lower granularity profile that is associated with the profile of the cloud resource has previously been determined to be a target of an anomalous operation in response to determining the event type indicates anomalous behavior.

3. The system of claim 2, wherein the operations further comprise:
determining a probability that the anomalous customer interaction and the anomalous operation occur independent of each other is below a specified first threshold and a probability that the anomalous customer interaction and the anomalous operation occur within a specified period of time of each other is greater than a specified second threshold; and
providing a single alert to a client device indicating the anomalous behavior on the cloud resource further in response to the determined probability being greater than the specified second threshold.

4. The system of claim 1, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity.

5. The system of claim 4, wherein the operations further comprise comparing the score to a minimum threshold and refraining from presenting the score on the view in response to determining the score is less than the minimum threshold.

6. The system of claim 1, wherein, identifying whether another cloud resource of the cloud resources with a lower granularity profile that is associated with the profile of the cloud resource has previously been determined to be a target of an anomalous operation includes using a machine learning technique configured to classify anomalous operations into a single malicious attack type.

7. The system of claim 1, wherein the operations further comprise identifying an entity associated with the event data and comparing an operation associated with the event data to an entity profile for the identified entity and any entity profiles with a lower granularity than the entity profile that is associated with the entity.

8. The system of claim 1, wherein determining whether the event data is associated with anomalous customer interaction with the cloud resource includes determining that a likelihood of the customer performing an operation associated with the event is less than a threshold probability based on the profile.

9. The system of claim 8, wherein identifying whether another cloud resource of the cloud resources with a lower granularity profile that is associated with the profile of the cloud resource has previously been determined to be a target of an anomalous operation includes determining that a likelihood of the customer performing an operation associated with the event is less than a threshold probability based on the lower granularity profile.

10. A non-transitory machine-readable medium including instructions that, when executed by a machine, cause the machine to perform operations for cloud resource security, the operations comprising:
identifying a profile of profiles associated with event data, the event data regarding an operation performed on a cloud resource of cloud resources and including data identifying the cloud resource that is a destination of the operation and the client that is a source of the operation;
wherein, each profile of the profiles details non-anomalous behavior of a client interaction with a cloud resource of the cloud resources, wherein each profile is assigned a granularity level of a plurality of granularity levels, where each profile specifies a different cloud resource of the cloud resources, each higher granularity profile of the profiles assigned to each granularity level above a lowest granularity level is associated with a lower granularity profile of the profiles, a cloud resource specified by the lower granularity profile must be accessed to perform an operation on a cloud resource of the higher granularity profile;
determining whether the event data is associated with anomalous customer interaction with the cloud resource;
in response to determining the event data is associated with anomalous customer interaction, identifying another cloud resource of the cloud resources with a lower granularity profile that is associated with the profile of the cloud resource and whether the another cloud resource has previously been determined to be a target of an anomalous operation; and
providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

11. The non-transitory machine-readable medium of claim 10, wherein the operations further include:
before identifying the profile associated with the event data, determining whether an event type of the event data indicates the event data indicates anomalous behavior; and
determining whether another cloud resource of the cloud resources with a lower granularity profile that is associated with the profile of the cloud resource has previously been determined to be a target of an anomalous operation in response to determining the event type indicates anomalous behavior.

12. The non-transitory machine-readable medium of claim 11, wherein the event type is a failed login.

13. The non-transitory machine-readable medium of claim 10, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity.

14. The non-transitory machine-readable medium of claim 13, wherein the operations further comprise comparing the score to a minimum threshold and refraining from presenting the score on the view in response to determining the score is less than the minimum threshold.

15. The non-transitory machine-readable medium of claim 10, wherein, identifying whether another cloud resource of the cloud resources with a lower granularity profile that is associated with the profile of the cloud resource has previously been determined to be a target of an anomalous operation includes using a machine learning technique configured to classify anomalous operations into a single malicious attack type.

16. A method for cloud resource security, the method comprising:
identifying a profile of profiles associated with event data, the event data regarding an operation performed on a cloud resource of cloud resources and including data identifying the cloud resource that is a destination of the operation and the client that is a source of the operation;
wherein, each profile of the profiles details non-anomalous behavior of a client interaction with a cloud resource of the cloud resources, wherein each profile is assigned a granularity level of a plurality of granularity levels, where each profile specifies a different cloud resource of the cloud resources, each higher granularity profile of the profiles assigned to each granularity level above a lowest granularity level is associated with a lower granularity profile of the profiles, a cloud resource specified by the lower granularity profile must be accessed to perform an operation on a cloud resource of the higher granularity profile;
determining whether the event data is associated with anomalous customer interaction with the cloud resource;
in response to determining the event data is associated with anomalous customer interaction, identifying another cloud resource of the cloud resources with a lower granularity profile that is associated with the profile of the cloud resource and whether the another cloud resource has previously been determined to be a target of an anomalous operation; and
providing a single alert to a client device indicating the anomalous behavior on the cloud resource in response to determining both (a) the event data is associated with anomalous customer interaction with the cloud resource and (b) it was previously determined that the another cloud resource is determined to be the target of the anomalous operation.

17. The method of claim 16, further comprising identifying an entity associated with the event data and comparing an operation associated with the event data to an entity profile for the identified entity and any entity profiles with a lower granularity than the entity profile that is associated with the entity.

18. The method of claim 16, wherein determining whether the event data is associated with anomalous customer interaction with the cloud resource includes determining that a likelihood of the customer performing an operation associated with the event is less than a threshold probability based on the profile.

19. The method of claim 18, wherein identifying whether another cloud resource of the cloud resources with a lower granularity profile that is associated with the profile of the cloud resource has previously been determined to be a target of an anomalous operation includes determining that a likelihood of the customer performing an operation associated with the event is less than a threshold probability based on the lower granularity profile.

20. The method of claim 16, wherein providing the single alert to the client device includes providing a view of entities, monitored malicious behavior, and cloud resources associated in a hierarchy and an associated score for each combination of respective entities, monitored malicious behavior, and cloud resources, the score indicating a likelihood that the monitored malicious behavior is occurring on the cloud resource by the entity.

* * * * *